Jan. 15, 1963   J. D. DAVIDSON   3,073,965
AUTOMATIC SYNCHRONIZING SYSTEM
Filed May 15, 1961   3 Sheets-Sheet 1

WITNESSES
John C. Hensley, Jr.
James T. Young

INVENTOR
John D. Davidson
BY F. V. Lyle
ATTORNEY

Jan. 15, 1963  J. D. DAVIDSON  3,073,965
AUTOMATIC SYNCHRONIZING SYSTEM
Filed May 15, 1961  3 Sheets-Sheet 3

United States Patent Office 3,073,965
Patented Jan. 15, 1963

3,073,965
AUTOMATIC SYNCHRONIZING SYSTEM
John D. Davidson, North Huntingdon Township, Westmoreland County, Pa., assignor to Westinghouse Electric Corporation, East Pittsburgh, Pa., a corporation of Pennsylvania
Filed May 15, 1961, Ser. No. 110,093
10 Claims. (Cl. 307—87)

The present invention relates to synchronizing the two generators of a cross-compound turbine generator unit and, more particularly, to an automatic system for controlling the application of field excitation to the generators to effect synchronizing.

Cross-compound steam turbine generator units consist of two turbines each driving an electric generator, the most usual arrangement consisting of a high pressure turbine and a low pressure turbine, with steam exhausting from the high pressure turbine to the low pressure turbine, although other arrangements are possible and are sometimes used. The two generators are electrically connected in parallel and are operated as a unit. In starting such a cross-compound unit, it is necessary to initially rotate the shafts at a very low speed to insure uniform heating of the turbine rotors, and this is done by means of turning gear which consists of an electric motor for each turbine arranged to drive the shaft through a gear train and a clutch which disengages the turning gear when the shaft speed is increased. The two generators are usually synchronized with each other during this period of low speed operation, and after the generators have been synchronized, steam is admitted to the turbines and the unit is brought up to normal operating speed for connection to the line.

Synchronizing the two generators of a cross-compound unit at low speed is accomplished by applying field excitation to the generator rotors, and if the rotors are sufficiently close to being in phase with each other, that is, if their rotational positions relative to their respective stators are sufficiently close to being the same for both machines, the two generators will pull into step and operate in synchronism. It is necessary, therefore, for the rotors to be in the proper rotational positions with respect to each other when field excitation is applied, as the generators may fail to pull into step if the rotors are too far from synchronism and one or both of the turning gears may disengage.

Heretofore, it has been customary to synchronize the two generators of a cross-compound unit manually by first attempting to bring the rotors of the two machines into synchronism with each other and then manually applying field excitation. Various methods of synchronizing have been used, such as inching the rotors into phase with each other by alternate starting and stopping of one or both shafts, or starting one shaft first and after it has reached the turning gear speed attempting to start the second shaft at a time such that the rotors will be in phase when the second shaft reaches the turning gear speed. Either of these methods is difficult to apply and neither is adaptable to automatic operation, although automatic synchronizing of cross-compound units would be very desirable as there is an increasing demand for automatic power station operation. Another method of synchronizing which is more suitable for automatic operation consists in rotating the shafts of the two generators at slightly different electrical speeds, so that the two rotors are periodically in phase with each other at regular intervals and field excitation can be applied during these periods.

In manual operation, with any of these methods of synchronizing, the field excitation is applied manually and necessarily in a more or less random manner, since direct visual observation of the shafts to determine when they are in synchronism is usually not practical, and in many cases the machines are not visible at all from the operator's location. Thus, it has been necessary to apply field excitation on a trial and error basis, and if the generators failed to pull into step they had to be restarted and another attempt made. This type of operation is difficult and time-consuming, and obviously is not suitable for automatic control.

The method of synchronizing in which the shafts are rotated at slightly different speeds is adaptable to automatic control by providing suitable means for indicating when the rotors pass through synchronism and for applying field excitation at the correct time. In attempting to do this, however, a further problem arises due to the time constants of the highly inductive generator and exciter field circuits. Thus, the synchronizing operation may be initiated at any time, and if field excitation should be applied at a time when the rotors have passed through synchronism and are beginning to pull apart, the time required for the generator field current to reach its steady state value may be such that the rotors are then too far from synchronism for the machines to successfully pull into step. An automatic system, therefore, must take this problem into account and must operate so that field excitation is always applied before the rotors have reached actual synchronism with each other, so that the field current will have time to reach its steady state value while the rotors are still close enough to being in phase for the machines to pull into step.

The principal object of the present invention is to provide such an automatic system for synchronizing the two generators of a cross-compound turbine generator unit.

Another object of the invention is to provide an automatic system for detecting the relative rotational positions of two generator shafts rotating at slightly different speeds, and for applying field excitation to the generators when the relative phase position of the rotors is close enough to synchronism to cause the generators to pull into step for parallel operation.

A further object of the invention is to provide an automatic synchronizing system for cross-compound turbine generator units which detects the relative phase position of two rotors rotating at slightly different speeds and applies field excitation to the generators only when the rotors are within a predetermined angular distance of being in phase with each other and are approaching synchronism, so that the field current will have time to reach its steady state value before the rotors have passed too far beyond synchronism for successful synchronizing of the generators.

More specifically, the invention provides an automatic system for synchronizing the two generators of a cross-compound unit rotating on turning gear at slightly different speeds which includes an indicating means for providing a signal when the rotors are within a predetermined angular distance of being in phase with each other, and control means responsive to the signal from the indicating means and including means for preventing operation in response to an initial signal from the indicating means and for applying field excitation to the generators in response to a subsequent signal. In this way, operation is prevented if the rotors have passed through synchronism and are beginning to pull apart when the first signal occurs upon initiation of the synchronizing operation, and field excitation is applied only in response to a subsequent signal which indicates that the rotors are approaching synchronism and that field excitation can be applied with assurance that the machines will pull into step.

The invention will be more fully understood from the following detailed description of a preferred embodiment, taken in connection with the accompanying drawings, in which.

As previously indicated, the control system of this invention is intended for use wth cross-compound generator units in which the two generators are rotated on turning gear at slightly different speeds. The control system includes an indicating means for providing a signal when the two rotors are within a predetermined angular distance of being in phase with each other, and control means which operates in response to signals from the indicating means to apply field excitation to the generators at the correct time.

Figure 1:
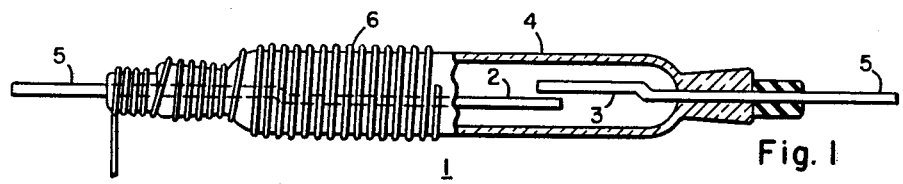
FIGURE 1 is a view, partly in elevation and partly in longitudinal section, of a switch device utilized as part of the indicating means.

Any suitable type of indicating means may be utilized which will provide a signal when the two rotors are in the desired relative positions. The preferred type of indicating means, however, is that disclosed and claimed in a copending application of J. D. Davidson and F. J. Murphy, Serial No. 110,092, filed May 15, 1961. As more fully explained in that application, this indicating means consists of a plurality of switches arranged to be successively actuated one after the other as the shaft with which they are associated rotates, and connected to provide an indication of the rotational position of the shaft. The switch devices are preferably of the magnetic reed type shown in FIG. 1, which shows a switch device 1 consisting of two electrode members 2 and 3 which are selaed at their ends in a glass envelope 4, the ends of the electrodes extending through the envelope to provide terminals 5. The electrode 2 is highly resilient and the electrodes are made of magnetic material, so that when an external magnetic field is applied, the electrodes move into contact to close the switch and when the field is removed the electrodes separate to open the circuit. Such switches are commercially available and are highly reliable and very fast in operation. In order to control the switch 1 to hold it closed when desired, a coil or solenoid 6 is provided which may be wound directly on the glass envelope 4 of the switch. It will be seen that when the coil 6 is energized a magnetic field is provided which holds the switch in closed position.

Figure 2:
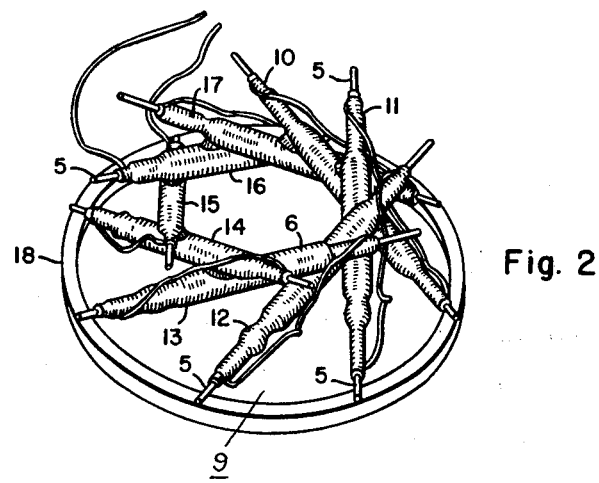
FIG. 2 is a perspective view of an assembly or array of switch devices.
Figure 3:
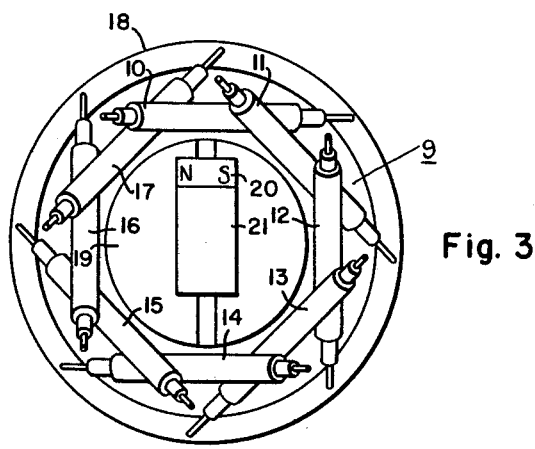
FIG. 3 is an end view of the array of switch devices and the actuating means for successively actuating the switches.

The indicating means utilizes a plurality of switches 1, any suitable number being provided, and in the preferred emodiment, eight switches are used designated 10 to 17 inclusive. As shown in FIG. 2, the eight switches are mounted in a circular array or assembly 9 with one terminal 5 of each switch attached to a supporting ring 18 which is preferably a metal ring to serve as a common connection for one side of each switch. The switches are preferably angularly disposed and arranged in overlapping positions, as shown in FIGS. 2 and 3, to provide a compact assembly. Separate leads (not shown) are brought out from the free terminals 5 of the switches, and the coils 6 of the eight switches are preferably connected together in series, although they may be connected in parallel or in any ohter desired manner for simultaneous energization.

The switch devices 10 through 17 are successively actuated magnetically as the generator shaft with which they are associated rotates. For this purpose, as shown in FIG. 3, a shaft 19 is provided which is attached to or connected with the generator shaft in any suitable manner to rotate with the generator shaft at the same speed. A permanent magnet 20 is attached to the shaft 19 in any desired manner, and as shown somewhat diagrammatically in FIG. 3, the magnet 20 may be held in place by a spacing block 21 clamped between two clamping elements which form part of the shaft 19.

It will be understood that the magnet 20 may be mounted in any suitable manner to rotate with the generator shaft in a position to successively actuate the switches 10 through 17. In the preferred embodiment shown in FIG. 3, the circular array 9 is positioned around the shaft 19 so that the magnet 20 actuates the switches one after the other as the shaft rotates. The switch assembly 9 may be encapsulated in a suitable resin, or it may be mounted and supported in any other suitable manner.

Figure 4:
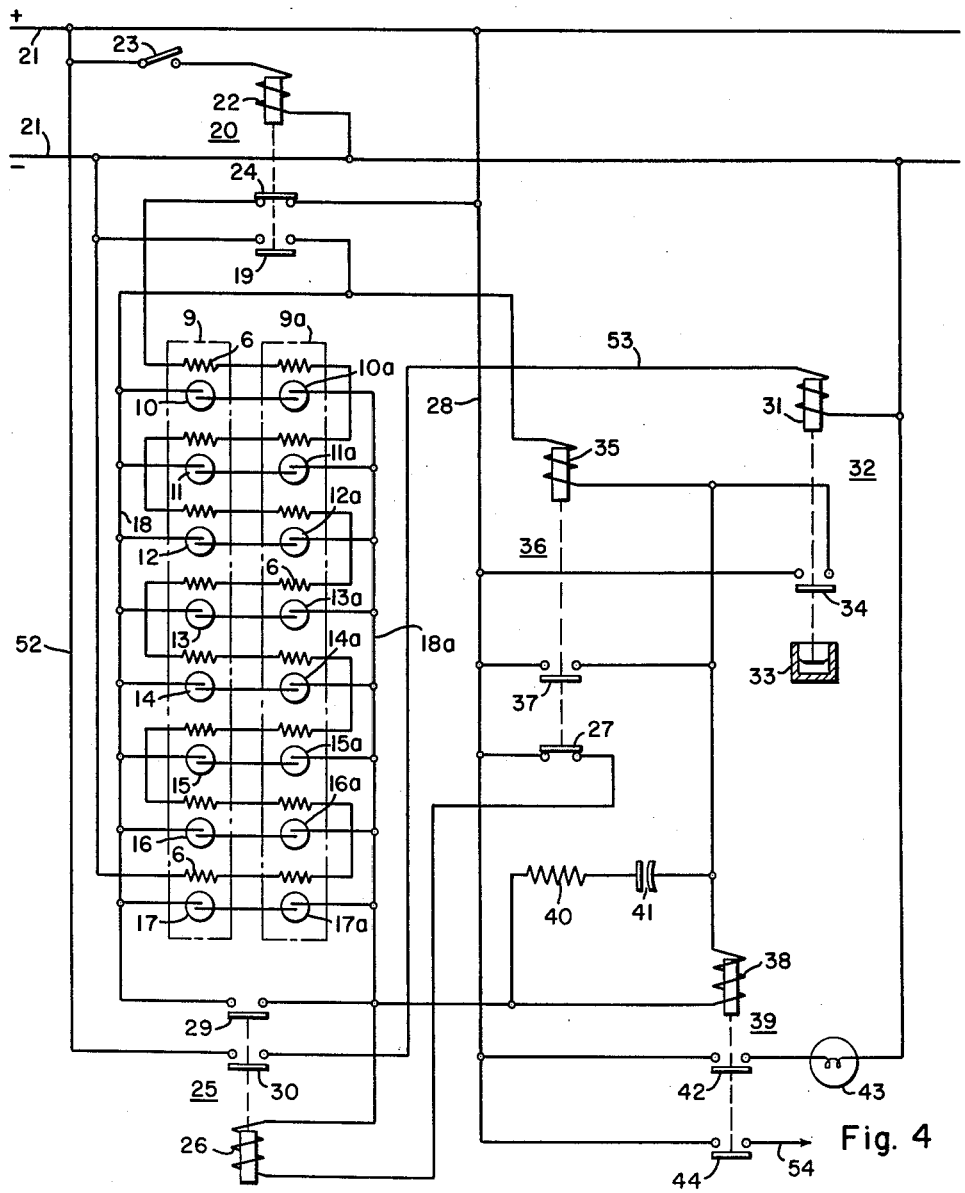
FIG. 4 is a circuit diagram showing the complete automatic synchronizing system.

In applying this indicating means to a cross-compound turbine generator unit, the switch assembly 9 is applied to one of the two generators and a second switch assembly 9a, identical to the switch assembly 9, is provided for the second generator, the switches 10a to 17a of the second switch assembly being actuated by a magnet rotating with the shaft of the second generator. One terminal of each of the switches of the first switch assembly 9 is connected to a common connection 18, as described above, and one terminal of each of the switches of the second switch assembly is similarly connected to a common connection 18a. The other terminal of each switch is connected to the free terminal of a switch of the other switch assembly as shown in FIG. 4.

The switches which are thus connected together in series are located in corresponding positions in the two assemblies, that is, the switch assemblies are positioned so that switches which are connected together will both be closed when the rotors are within a predetermined angular distance of being in phase with each other. As the rotors rotate, both switches of successive pairs of series-connected switches will close as long as the rotors are close to being in phase. Each switch will, of course, remain closed while its rotor is passing through some definite angular distance and then opens while the next switch closes, usually with a short interval between the opening of one switch and the closing of the next. There is thus a definite angular distance on each side of exact synchronism where corresponding switches of the two rotors will both be closed, and in a preferred embodiment of the invention this distance is such that a pair of series-connected switches will be closed simultaneously when the rotors are within plus or minus 35° of being exactly in phase with each other.

The common connection 18 of the switch assembly 9 is connected through a contact 19 of a relay 20 to one side of a source 21 of direct current low voltage control power. Thus, when the rotors are within the predetermined angular distance of being in phase with each other, both switches of one pair of series-connected switches will be closed, and if the relay contact 19 is closed an output signal will occur on the common conductor 18a. When the rotors are outside this angular distance of being in phase, the switches which are closed at any time will be in different pairs and there will be no signal on the conductor 18a. Thus, the indicating means described provides an output signal whenever the rotors are within a predetermined angular distance of being in phase with each other, and this signal is used to actuate the control means which applies field excitation to the generators.

The control means includes the relay 20 mentioned above which has an operating coil 22 connected through a switch 23 across the line 21. The relay 20 has the contact 19 mentioned above and a normally closed contact 24 connected in series with the holding coils 6 of the switches. It is not desirable to have the switches operating continuously after the machines have been synchronized and are running at normal speed, and the holding coils 6 are provided to prevent such operation. The coils 6 of all the switches may be connected together in series as shown, or in any other suitable manner for simultaneous energization, and are connected across the line 21 through the relay contact 24.

The control system also includes a relay 25 which has an operating coil 26 connected to the output conductor 18a of the indicating means and through a normally closed relay contact 27 to the other side of the line 21 through a conductor 28. The relay 25 has a contact 29 connected across the two switch assemblies as shown, and a contact 30 which is connected across the supply line 21 in series with the operating coil 31 of a time delay relay 32. The time delay relay 32 may be of any suitable type and has a delay mechanism, indicated diagrammatically at 33, which is adjusted so that the relay will close its contact 34 after a time interval which is made at least equal to, and preferably slightly greater than (the time required for the two rotors to pass through the angular distance during which both switches of a pair of series-connected switches remain closed, that is, the time during which the two rotors are within the predetermined angular distance of being in synchronism, as described above. The time delay relay contact 34 is connected to the line 21 through conductor 28 and to the operating coil 35 of a relay 36. The other side of the coil 35 is connected to the other side of the line 21 through the relay contact 19. The relay 36 has the normally closed contact 27 mentioned above and a normally open contact 37. The contact 37 is connected to the line 21 through conductor 28 and is connected to the operating coil 35 and also to the operating coil 38 of a relay 39. The other side of the relay coil 38 is connected to the output conductor 18a of the indicating means. A holding circuit consisting of a resistor 40 and a capacitor 41 is connected across the relay coil 38 to prevent chattering of the relay. The relay 39 is the final control relay of the system and is shown as having a contact 42 connected to a signal lamp 43 and a contact 44 which controls the generator field excitation.

Figure 5:
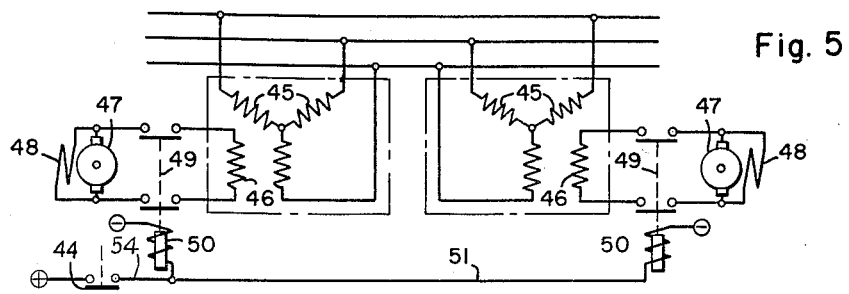
FIG. 5 is a simplified diagram illustrating the electrical circuits of a typical cross-compound turbine generator unit.

A typical excitation system for a cross-compound turbine generator unit is shown in FIG. 5. As there shown, each generator has three-phase stator windings 45 and has a field winding 46 on the rotor. The field winding of each machine is excited with direct current from an exciter 47, shown as having a self-excited shunt field winding 48. Each exciter 47 is connected to its generator field winding 46 by means of a generator field circuit breaker 49. The two generators are connected electrically in parallel for operation as a unit and, as previously explained, they are usually synchronized during low speed turning gear operation. Synchronization is accomplished by applying field excitation to the two fields 46 at the correct time when the rotors are sufficiently close to being in the same relative phase positions, and the two machines then pull into step for operation in parallel. In the illustrated example, field excitation is applied by simultaneously closing the field circuit breakers 49 by energizing their operating coils 50 through a conductor 51.

In accordance with the present invention, the two generators are brought into synchronism by rotating them at slightly different speeds during turning gear operation. Thus, for example, if the generators are two-pole machines, with a normal operating speed of 3600 r.p.m., they may be rotated on turning gear during the initial starting period at speeds of 3.0 r.p.m. and 3.5 r.p.m., respectively. At these speeds, the faster rotor will periodically overtake the slower one and the two rotors will be in phase with each other at regular intervals of about every two minutes. The rotors will remain within plus or minus 35° of being exactly in phase with each other for approximately 23 seconds each time they pass through synchronism, and the field excitation must be applied during this period when they are close enough to synchronism to insure that the machines will pull into step. If excitation is correctly applied, the lower speed machine will accelerate to the speed of the higher speed machine as a synchronous motor and its turning gear will disengage.

There is a further problem, however, due to the time constants of the highly inductive generator field circuits. Thus, in a typical large generator, the time required for the generator field current to reach its final steady state value after the field breaker is closed is of the order of 4 to 6 seconds. In some excitation systems, a generator field breaker is not used and the excitation is controlled by a breaker in the exciter field circuit. When an exciter field breaker is used, the time required for the generator field excitation to reach its steady state value is of course further increased by the time required for the exciter field current to build up. Thus, if the generator rotors have passed through synchronism and are moving apart at the instant the breakers are closed in the excitation circuit, the time required for the field currents to reach their normal value may be great enough that the rotors are then too far from synchronism to permit the machines to pull into step. The field excitation should therefore always be applied while the rotors are within the 35° distance of synchronism but before synchronism is reached, that is, excitation should always be applied while the rotors are approaching synchronism and not after they have passed through it. If this is done, field excitation will be applied at the proper time to allow the field currents to build up to normal value while the rotors are still close enough to synchronism to insure that the machines will pull into step.

The control system of FIG. 4 provides for this type of operation. Assuming that the two machines are being rotated by their respective turning gears at slightly different speeds, the operation of synchronizing them is initiated by closing the switch 23. This may be done either manually or by a signal from a computer or other automatic control means as part of a complete automatically controlled starting sequence. When the switch 23 closes, the relay 20 is energized and opens its contact 24, de-energizing the holding coils 6 of the switches of the two switch assemblies 9 and 9a so that the switches open and are free to operate. At the same time, the contact 19 closes and connects the common connection 18 of the switch assembly 9 to one side of the line 21.

The closing of switch 23 may occur at any time and the rotors of the two machines may be in any position with respect to each other at the instant the switch is closed. If they are outside the predetermined angular distance of being in synchronism, as previously described, no two series-connected switches will be simultaneously closed. When the rotors come within the predetermined distance of synchronism, or if they are within this range at the instant the switch 23 is closed, one series-connected pair of switches will close simultaneously, and as the rotors continue to rotate successive pairs of series-connected switches will close simultaneously as long as the rotors are within this angular distance of synchronism. When such simultaneous closure of a pair of series-connected switches occurs, the output conductor 18a of the indicating means is connected to conductor 18 and through relay contact 19 to one side of the line 21. The relay 25 is then energized from conductor 18a, the circuit extending through closed relay circuit contact 27 and conductor 28, and the relay 25 closes its contacts. Contact 29 is connected across the two switch assemblies 9 and 9a, and thus connects the relay coil 26 directly to conductor 18 to hold the relay in. The relay contact 30 connects the coil 31 of the time delay relay 32 across the line 21 through conductors 52 and 53. The time delay relay 32 is thus energized and at the end of the time delay period for which it is set it closes its contact 34.

As previously explained, the delay time of the relay 32 is set to be not less than, and preferably somewhat greater than, the time required for the rotors to pass through the angular distance during which corresponding switches of the two switch assemblies are closed. This insures that the rotors will have passed through synchronism and will be outside the predetermined angular distance when the relay 32 closes its contact. When the relay contact 34 of the time delay relay 32 closes, it completes a circuit from one side of the line 21 through conductor 28 and contact 34 to the relay coil 35 which is connected to the other side of the line through contact 19. The relay 36 is thus energized and opens its contact 27, which deenergizes relay 25 so that it drops out and opens its contact 29, removing the short-circuit across the two switch assemblies. At the same time relay 36 closes its contact 37 which connects the relay coil 38 to one side of the line 21, the contact 37 also serving as a holding contact to maintain energization of the relay 36. The other side of the relay coil 38 is connected to the output conductor 18a of the indicating means.

The relay 39 is thus connected to the indicating means and when the rotors again come within the predetermined distance of being in synchronism a pair of series-connected switches of the two switch assemblies simultaneously close and the relay 39 is energized to close its contacts 42 and 44. Since the rotors are rotating continuously and successive pairs of switches will operate one after the other, with a slight time interval between the opening of one pair of switches and the closing of the next, the RC circuit 40, 41 is provided to maintain energization of the relay 39 during these periods and prevent chattering of the relay.

The contacts of the relay 39 may be connected in any desired manner to control the application of field excitation to the generators. As shown in the drawing, the contact 42 is connected to energize a signal light 43 to indicate operation of the relay, and the contact 44 is connected to control the application of field excitation by providing a voltage signal on conductor 54 for application to the excitation circuits of the generators. This signal may be utilized in any desired manner to effect closing of the generator field circuit breakers, or exciter field breakers, and in the simplest application conductor 54 may be connected directly to the conductor 51, as shown in FIG. 5, to cause the breakers 49 to close. It will be understood that this particular circuit arrangement is only illustrative, and that the voltage signal appearing on conductor 54 may be used in any desired manner to effect application of field excitation to the generators. Since the two rotors are within the desired angular distance of being in phase with each other, and are approaching the point of exact synchronism, field excitation is applied at the correct point with sufficient time for the field currents to build up to their steady state values while the rotors are close enough to synchronism to insure that the machines will pull into step.

It will be seen that the operation of the control system is responsive to an output signal from the indicating means, appearing on the conductor 18a, and that the control system includes a time delay relay which prevents operation in response to the initial signal from the indicating means, and after the lapse of a sufficient time interval to insure that the rotors have passed completely through synchronism, the time delay relay then sets up a circuit for energizing the final relay 39 in response to a subsequent signal from the indicating means. In this way the switch 23 can be closed at any time to initiate the synchronizing operation but application of field excitation is prevented until the rotors have once passed through synchronism and are again approaching synchronism. In this way field excitation is always applied accurately at the desired point to insure that synchronizing of the two machines is successfully accomplished.

Figure 6:
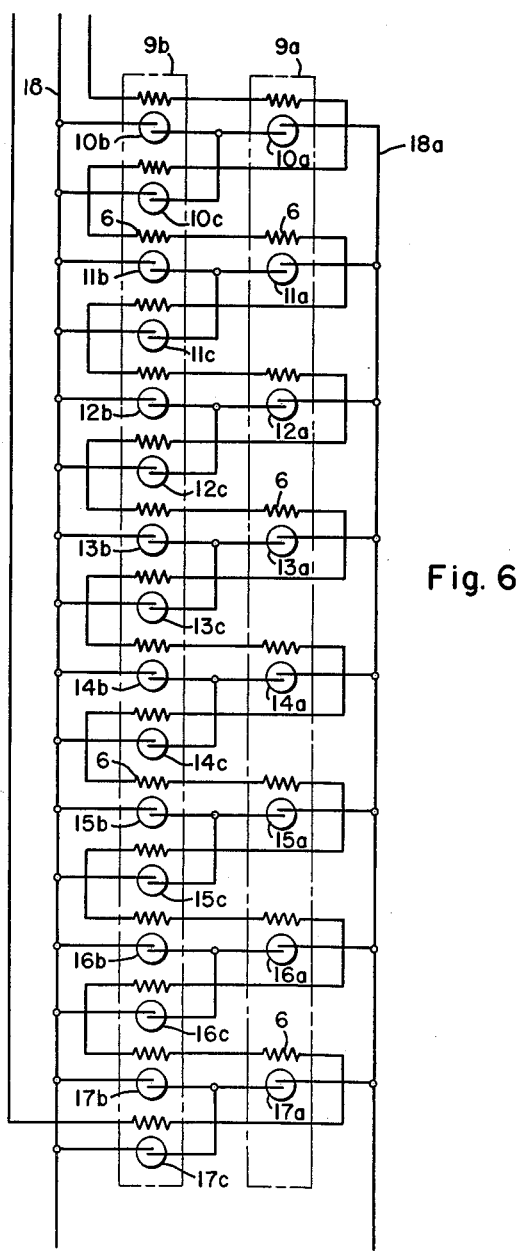
FIG. 6 is a partial circuit diagram which, in connection with FIG. 4, illustrates a modified embodiment of the invention.

In many cases, both generators of a cross-compound unit are identical and rotate at the same speed, and the indicating means shown in FIG. 4 is suitable for such a unit. In other cases, however, the two generators have different numbers of poles, usually two poles and four poles, respectively, so that one generator rotates at half the speed of the other, the normal speeds being 3600 r.p.m. and 1800 r.p.m., respectively. The indicating means described above is easily adaptable to such a unit, as disclosed in the above-mentioned copending application and as shown in FIG. 6.

In this figure, the switch assembly 9a for the high speed machine is identical to the switch assembly 9a previously described. The switch assembly 9b for the low speed machine, however, uses twice as many switches. Since the low speed generator has twice as many poles and rotates at half the speed of the high speed generator, there are two positions in each revolution of the low speed rotor where it is in synchronism with the high speed rotor. As shown in FIG. 6, therefore, sixteen switches are utilized, in the illustrated embodiment, and diametrically opposite switches are connected together in parallel. The switches 10b through 17b correspond to the switches 10 through 17 of FIG. 4, but in the physical arrangement of the switch assembly these switches are placed adjacent to each other and extend over only half the circumference of the circular assembly, which corresponds to 360 electrical degrees of the four pole generator. A second group of eight switches 10c through 17c is provided and extends around the other half of the circumference of the circular array. The switches of the second group are connected in parallel with the corresponding switches of the first group, as shown in FIG. 6, the corresponding switches being diametrically opposite each other in actual physical position. Each pair of paralleled switches is connected to a corresponding single switch of the switch assembly 9a of the high speed generator. The common connections 18 and 18a are connected in the control circuit as shown in FIG. 4 and it will be seen that the operation is the same as described above, series-connected switches closing simultaneously twice in each revolution of the low speed shaft as the rotors pass through synchronism.

It should now be apparent that an automatic synchronizing system has been provided for synchronizing the two generators of a cross-compound turbine generator unit which provides completely automatic control to accurately and reliably apply field excitation to the machines at the correct time to insure that they will pull into step. It will also be obvious that various modifications and additions may be made within the scope of the invention. Thus, for example, if a visual indication of the relative positions of the rotors is desired, the switches of the two switch assemblies may be individually connected to indicating lamps which may preferably be arranged in concentric circles in the manner disclosed in the above-mentioned copending application, the lamp circuits preferably being isolated from the control circuits by rectifiers or other suitable means. In this way, the operator would be able to follow the operation visually by observing the relative positions of the two rotors as the indicating lamps successively light in response to the successive closing of the switches to which they are connected. Other modifications may also be made if desired, and other types of indicating means might be used with the control circuit shown and described, since any suitable indicating means may be utilized which will provide an output signal to the control circuit whenever the rotors are within a predetermined angular distance of being in phase with each other.

Various other modifications and embodiments of the invention are also possible, and it is to be understood that all such modifications and embodiments are within the scope of the invention since it is not limited to the specific circuit arrangement and details of construction shown and described, which are illustrative only.

I claim as my invention:

1. A system for effecting synchronization of two alternating current generators having rotors rotating at slightly different speeds, said system comprising indicating means associated with the generators for providing a signal when the two rotors are within a predetermined angular distance of being in phase with each other, and control means responsive to said signal, said control means including means for preventing operation in response to an initial signal from the indicating means, and means for effecting application of field excitation to said generators in response to a subsequent signal from the indicating means.

2. A system for effecting synchronization of two alternating current generators having rotors rotating at slightly different speeds, said system comprising means associated with each generator for indicating the rotational position of the rotor, the indicating means of the two generators cooperating to provide a signal when the two rotors are within a predetermined angular distance of being in phase with each other, and control means responsive to said signal, said control means including means for preventing operation in response to an initial signal from the indicating means, and means for effecting application of field excitation to said generators in response to a subsequent signal from the indicating means.

3. A system for effecting synchronization of two alternating current generators having rotors rotating at slightly different speeds, said system comprising means associated with each generator for indicating the rotational position of the rotor, the indicating means of the two generators cooperating to provide a signal when the two rotors are within a predetermined angular distance of being in phase with each other, timing means actuated by an initial signal from the indicating means, said timing means providing a time interval not less than the time required for the rotors to pass through said angular distance, and means operative after the expiration of said time interval in response to a subsequent signal from the indicating means for effecting application of field excitation to the generators.

4. A system for effecting synchronization of two alternating current generators having rotors rotating at slightly different speeds, said system comprising means associated with each generator for indicating the rotational position of the rotor, the indicating means of the two generators cooperating to provide a signal when the two rotors are within a predetermined angular distance of being in phase with each other, and control means for effecting application of field excitation to the generators, said control means including timing means actuated in response to an initial signal from the indicating means for providing a time delay at least equal to the time required for the rotors to pass through said angular distance, and means operative thereafter for effecting application of field excitation in response to a subsequent signal from the indicating means.

5. A system for effecting synchronization of two alternating current generators having rotors rotating at slightly different speeds, said system comprising means associated with each generator for indicating the rotational position of the rotor, the indicating means of the two generators cooperating to provide a signal when the two rotors are within a predetermined angular distance of being in phase with each other, and control means for effecting application of field excitation to the generators, said control means including a time delay relay actuated in response to an initial signal from the indicating means, said time delay relay having a delay time not less than the time required for the rotors to pass through said angular distance, and relay means controlled by the time delay relay to respond to a subsequent signal from the indicating means to effect said application of field excitation.

6. A system for effecting synchronization of two alternating current generators having rotors rotating at slightly different speeds, said system comprising means associated with each generator for indicating the rotational position of the rotor, the indicating means of the two generators cooperating to provide a signal when the two rotors are within a predetermined angular distance of being in phase with each other, and control means for effecting application of field excitation to the generators, said control means including a time delay relay actuated in response to an initial signal from the indicating means, said time delay relay having a delay time not less than the time required for the rotors to pass through said angular distance, a first relay energized in response to operation of the time delay relay upon expiration of said delay time, and a second relay responsive to a signal from the indicating means to effect said application of field excitation, said first relay being connected to permit operation of the second relay only after energization of the first relay.

7. A system for effecting synchronization of two alternating current generators having rotors rotating at slightly different speeds, said system including indicating means comprising a first set of switch devices disposed in a circular array, switch actuating means rotatable with one of said rotors to effect successive actuation of said switch devices to closed position, a second set of switch devices disposed in a circular array, switch actuating means rotatable with the other of said rotors to effect successive actuation of the switch devices of the second set to closed position, each switch device of the first set being connected in series with a switch device of the second set located in a corresponding position such that both switch devices are closed when the two rotors are within a predetermined angular distance of being in phase with each other, means for connecting all the series-connected switch devices to a voltage source to provide a signal from the indicating means when any two series-connected switch devices are both closed, and control means responsive to said signal, said control means including means for preventing operation in response to an initial signal from the indicating means and means for effecting application of field excitation to said generators in response to a subsequent signal from the indicating means.

8. A system for effecting synchronization of two alternating current generators having rotors rotating at slightly different speeds, said system including indicating means comprising a first set of switch devices disposed in a circular array, switch actuating means rotatable with one of said rotors to effect successive actuation of said switch devices to closed position, a second set of switch devices disposed in a circular array, switch actuating means rotatable with the other of said rotors to effect successive actuation of the switch devices of the second set to closed position, each switch device of the first set being connected in series with a switch device of the second set located in a corresponding position such that both switch devices are closed when the two rotors are within a predetermined angular distance of being in phase with each other, means for connecting all the series-connected switch devices to a voltage source to provide a signal from the indicating means when any two series-connected switch devices are both closed, timing means actuated by an initial signal from the indicating means, said timing means providing a time interval not less than the time required for the rotors to pass through said angular distance, and means operative after the expiration of said time interval in response to a subsequent signal from the indicating means for effecting application of field excitation to the generators.

9. A system for effecting synchronization of two alternating current generators having rotors rotating at slightly different speeds, said system including indicating means comprising a first set of switch devices disposed in a circular array, switch actuating means rotatable with one of said rotors to effect successive actuation of said switch devices to closed position, a second set of switch devices disposed in a circular array, switch actuating means rotatable with the other of said rotors to effect successive actuation of the switch devices of the second set to closed position, each switch device of the first set being connected in series with a switch device of the second set located in a corresponding position such that both switch devices are closed when the two rotors are within a predetermined angular distance of being in phase with each other, means for connecting all the series-connected switch devices to a voltage source to provide a signal from the indicating means when any two series-connected switch devices are both closed, and control means for effecting application of field excitation to the generators, said control means including a time delay relay actuated in response to an initial signal from the indicating means, said time delay relay having a delay time not less than the time required for the rotors to pass through said angular distance, and relay means controlled by the time delay relay to respond to a subsequent signal from the indicating means to effect said application of field excitation.

10. A system for effecting synchronization of two alternating current generators having rotors rotating at slightly different speeds, said system including indicating means comprising a first set of switch devices disposed in a circular array, switch actuating means rotatable with one of said rotors to effect successive actuation of said switch devices to closed position, a second set of switch devices disposed in a circular array, switch actuating means rotatable with the other of said rotors to effect successive actuation of the switch devices of the second set to closed position, each switch device of the first set being connected in series with a switch device of the second set located in a corresponding position such that both switch devices are closed when the two rotors are within a predetermined angular distance of being in phase with each other, means for connecting all the series-connected switch devices to a voltage source to provide a signal from the indicating means when any two series-connected switch devices are both closed, and control means for effecting application of field excitation to the generators, said control means including a time delay relay actuated in response to an initial signal from the indicating means, said time delay relay having a delay time not less than the time required for the rotors to pass through said angular distance, a first relay energized in response to operation of the time delay relay upon expiration of said delay time, and a second relay responsive to a signal from the indicating means to effect said application of field excitation, said first relay being connected to permit operation of the second relay only after energization of the first relay.

No references cited.